// 
US007116339B2

(12) United States Patent
Wada

(10) Patent No.: US 7,116,339 B2
(45) Date of Patent: Oct. 3, 2006

(54) IMAGE RENDERING METHOD USING RECURSIVE INTERPOLATION

(75) Inventor: Shinya Wada, Tokyo (JP)

(73) Assignee: Sony Computer Entertainment Inc., (JP)

( * ) Notice: Subject to any disclaimer, the term of this patent is extended or adjusted under 35 U.S.C. 154(b) by 241 days.

(21) Appl. No.: 10/202,425

(22) Filed: Jul. 24, 2002

(65) Prior Publication Data

US 2003/0071825 A1    Apr. 17, 2003

(30) Foreign Application Priority Data

Oct. 11, 2001 (JP) ............... 2001-313919
May 9, 2002 (JP) ............... 2002-133584

(51) Int. Cl.
*G09G 5/00* (2006.01)
(52) U.S. Cl. ..................... 345/606; 345/619
(58) Field of Classification Search ............... 345/606, 345/698, 660, 667, 619; 360/702
See application file for complete search history.

(56) References Cited

U.S. PATENT DOCUMENTS

| 3,996,456 A | * | 12/1976 | Hoover ............... 708/801 |
| 5,109,481 A | | 4/1992 | Lathrop et al. |
| 5,179,647 A | | 1/1993 | Chang |
| 5,657,261 A | * | 8/1997 | Wilson et al. ............ 708/313 |
| 5,739,818 A | | 4/1998 | Spackman |
| 5,835,097 A | | 11/1998 | Vaswani et al. |

FOREIGN PATENT DOCUMENTS

| JP | 03-194671 A | 8/1991 |
| JP | 04-134571 A | 5/1992 |
| JP | 06-027928 A | 2/1994 |
| JP | 06-259567 A | 9/1994 |

OTHER PUBLICATIONS

Le Mestre, et al. "Iterative Vector Non-Linear Interpolation for the synthesis of Intermediate views", 1998.*
Numerical Recipes in FORTRAN 77: The Art of Scientific Computing (ISBN )-521-4306-X), Cambridge University Press, Copyright © 1986-1992.*
Watt, A. and M. Watt, Advanced Animation and Rendering Techniques; Theoty and Practice, 1992, ACM Press, pp. 21-27.*

* cited by examiner

*Primary Examiner*—Kee M. Tang
*Assistant Examiner*—Michelle K. Lay
(74) *Attorney, Agent, or Firm*—Lerner, David, Littenberg, Krumholz & Mentlik, LLP

(57) ABSTRACT

A parameter setting unit sets a parameter used in a predetermined interpolation calculation. A calculating unit performs the predetermined interpolation calculation based upon an input parameter. A feedback unit feeds back a value obtained through the predetermined interpolation calculation to the parameter setting unit. Then, the parameter setting unit resets the parameter based upon the value obtained through the predetermined interpolation calculation. Accordingly, an image rendering apparatus easily implements nonlinear interpolation by DDA processing which performs linear interpolation using polygon node coordinates in, for example, computer graphics, and implements rendering of, for example, curved line portions quickly and with light processing loads.

14 Claims, 7 Drawing Sheets

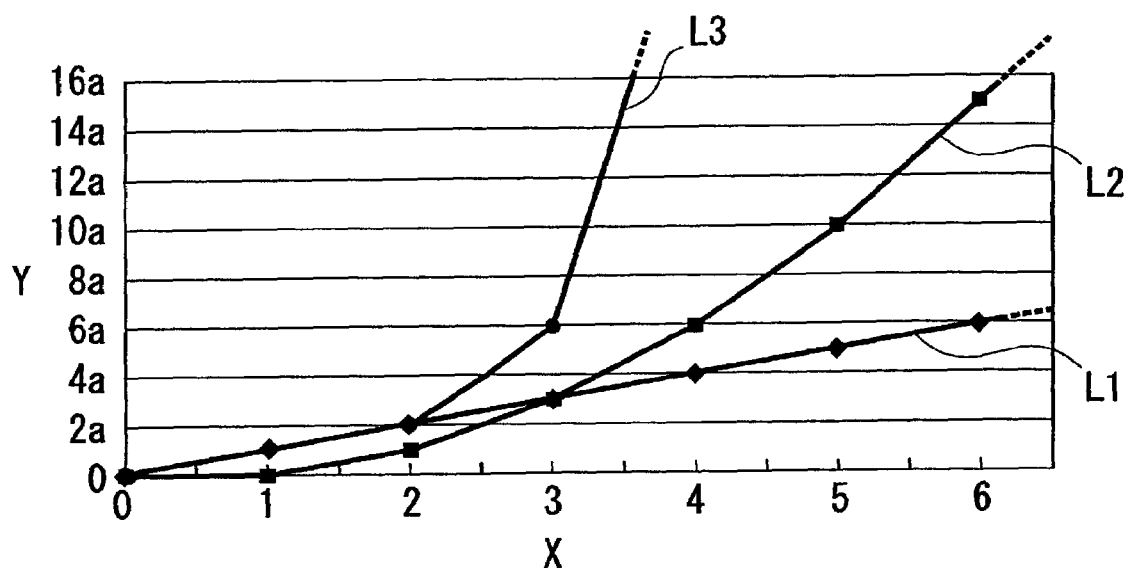

| k | x | y |
|---|---|---|
| 0 | 0 | 0 |
| 1 | 1 | a |
| 2 | 2 | 2a |
| 3 | 3 | 6a |
| 4 | 4 | 24a |
| 5 | 5 | 96a |
| ⋮ | ⋮ | ⋮ |

IMAGE RENDERING METHOD USING RECURSIVE INTERPOLATION

CROSS-REFERENCE TO RELATED APPLICATIONS

This application claims priority from Japanese Patent Application No. 2001-313919 filed on Oct. 11, 2001, and No. 2002-133584 filed on May 9, 2002, the disclosures of which are hereby incorporated by reference herein.

BACKGROUND OF THE INVENTION

The present invention relates to an image rendering method and apparatus which generate, for example, two-dimensional image information from three-dimensional polygon data, recording media recorded with an image rendering program, and the image rendering program.

In recent years, video game consoles and personal computers continue to see advances in, for example, higher integration and faster speeds of processors, memories, and the like. Accordingly, an image rendering apparatus configured with such a game console or personal computer can generate in real time, from three-dimensional image information, finer, high-definition two-dimensional images rich with diversity and which appear more life-like and give a higher sense of realism, and can render these two-dimensional images upon a two-dimensional screen.

Image rendering, which generates two-dimensional image information from three-dimensional polygon data, is generally comprised of geometry processing and rendering processing. Geometry processing for three-dimensional polygon data comprises geometry processing such as coordinate transformation, clipping and lighting, and perspective projection transformation processing and the like. Rendering processing is a process that generates pixels based upon post-projection transformation processing graphics information (polygon data) and generates two-dimensional image information by determining the color value of each of those pixels.

Incidentally, conventional image rendering apparatus are capable of forming objects by gathering a plurality of polygons. However, a polygon is represented by a multilateral shape in which the node coordinates are each connected by straight lines. As a result, for example, in the case where curved line portions of an object are rendered, the conventional image rendering apparatus approximately expresses the curved line portions by preparing a plurality of small polygons and linking the respective node coordinates that configure the sides of each polygon.

However, the image rendering apparatus when rendering such above-mentioned curved line portions, must process a plurality of polygon data in a short period of time, imposing an extremely heavy load as a result. In addition, the image rendering apparatus that is capable of processing a plurality of polygon data in a short time period needs to be highly efficient and expensive, interfering undesirably with the lowering of costs.

SUMMARY OF THE INVENTION

The present invention has come about in consideration of such issues, and the objective thereof is to provide an image rendering method and apparatus, recording media recorded with an image rendering program, and an image rendering program, which allow for rendering, for example, curved line portions quickly and with a light processing load.

The present invention sets a parameter used in a predetermined interpolation calculation, and performs the predetermined interpolation calculation based upon the parameter. The parameter is then reset based upon a value obtained through the predetermined interpolation calculation, and the predetermined interpolation calculation is performed based upon the reset parameter.

In other words, according to the present invention, for example, it is possible to implement a nonlinear interpolation calculation through adjusting the parameter by feeding back the value obtained through a linear interpolation calculation, and again performing a linear interpolation calculation using that adjusted parameter.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing the invention in practice.

BRIEF DESCRIPTION OF DRAWINGS

FIG. 2 is a diagram showing the x, y coordinate values generated by the first DDA processing.

FIG. 3 is a diagram showing a straight line generated by the first DDA processing and curved lines generated by the second DDA processing using the values obtained through the first DDA processing.

FIG. 4 is a diagram showing the x, y coordinate values generated by the second DDA processing.

DETAILED DESCRIPTION

Figure 1:
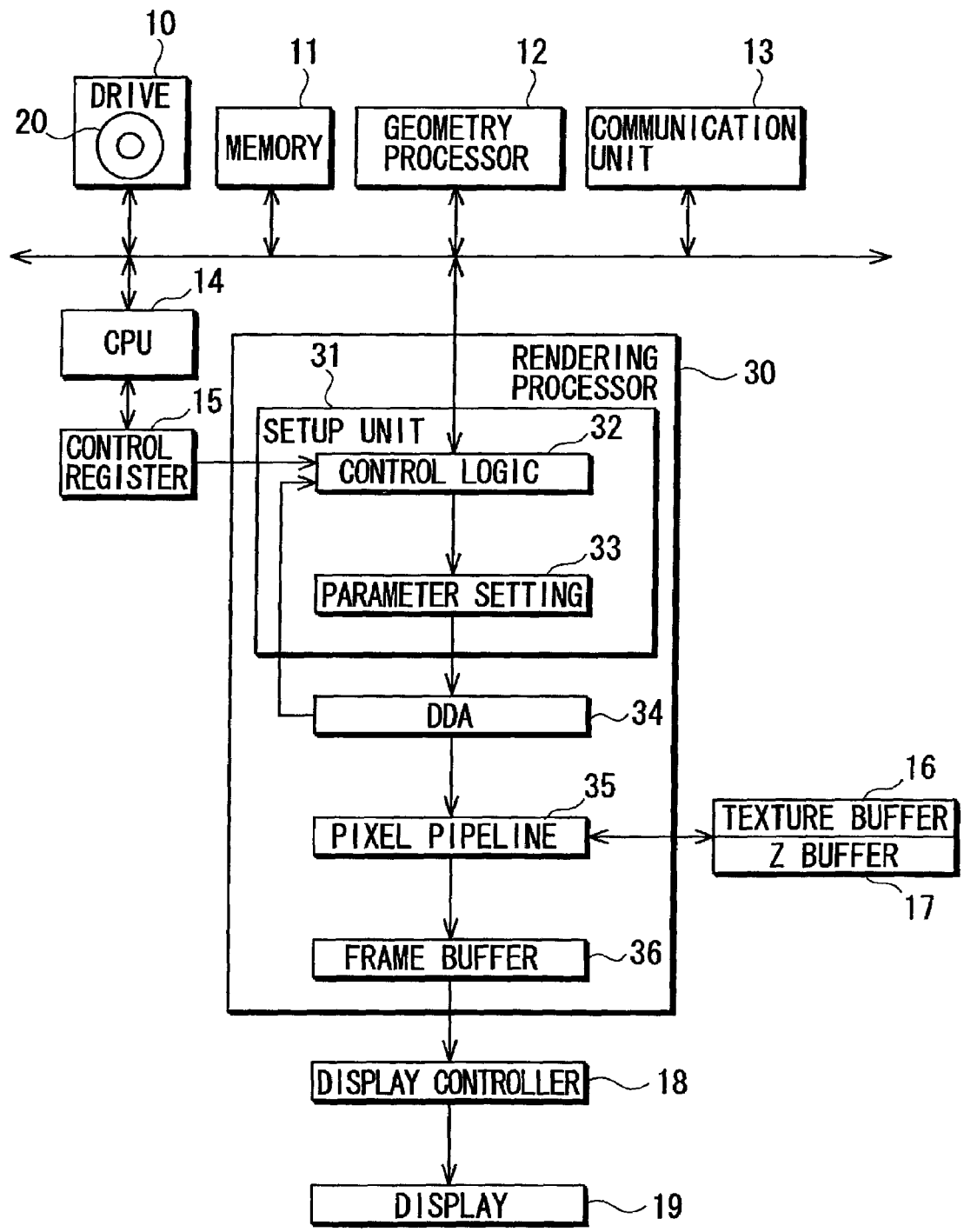
FIG. 1 is a diagram showing a schematic structure of an image rendering apparatus according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

An image rendering apparatus according to an embodiment of the present invention is described employing the structure shown in FIG. 1. Note that the example shown in FIG. 1 is a structural example of the image rendering apparatus of this embodiment implemented using hardware such as, for example, a digital signal processor (DSP) or a graphics processor (GP). Where the image rendering apparatus of this embodiment is implemented using a DSP or GP, each of the structural elements of FIG. 1 corresponds to the respective internal processing units of the DSP or GP.

In FIG. 1, the memory 11 stores the image rendering program of this embodiment, and in addition stores node information such as node coordinate values, RGB node color values, map coordinate values and vector values for structuring three-dimensional polygons, or graphics information such as node connection information. Note that the image rendering program and graphics information are, for example, either loaded by a disc drive unit 10 from various recording media such as a disc medium 20, for example, a CD-ROM or DVD-ROM, into the memory 11, or imported by a transmission unit 13 via wired or wireless telecommunication media or transmission media under the control of a CPU 14.

The geometry processor 12 reads out graphics information from the memory 11, and performs for that graphics information affine transformation, projection transformation to screen coordinates and ray tracing of the nodes under the control of the CPU 14. The post-projection transformation graphics information is sent to the rendering processor 30.

The rendering processor 30 is the portion that performs arithmetic processing for rendering a polygon upon the screen. More specifically, the rendering processor 30 calculates each pixel which forms the polygon from graphics information sent from the geometry processor 12, arranges the color values of each of those pixels by correlating them with the two-dimensional screen coordinates, and generates screen data for displaying the polygon upon the display 19 (two-dimensional screen). In the case of this embodiment, the rendering processor f30 is generally comprised of a setup unit 31, digital differential analyzer (DDA) unit 34, a pixel pipeline unit 35, and a frame buffer 36.

The setup unit 31 of this rendering processor 30 comprises a control logic 32 and a parameter setting unit 33; it imports graphics information sent from the geometry processor 12 or the feedback values from the subsequent DDA unit 34, and sets the parameters necessary for the DDA unit 34 to render a primitive polygon (initial coordinate values and gradient and the like for linear interpolation, hereafter referred to as DDA parameters). These DDA parameters are sent to the DDA unit 34. Note that the detailed structure of this setup unit 31 and its feedback loop with the subsequent DDA unit 34 is described later.

The DDA unit 34 linearly interpolates between the polygon node coordinates based upon the DDA parameters and generates the inner pixels of that polygon. Moreover, the DDA unit 34 calculates the R, G, and B values, an alpha value (translucent coefficient: A), and a Z value (information regarding the depth from the viewing point) of each pixel, texel coordinate values (an address (U, V) for referencing a texel color) for texture mapping, a fog value (the value for implementing rendering as if foggy) and the like. Each value for every one of those pixels is sent to the pixel pipeline unit 35.

While considering the Z value from the Z buffer 17, the pixel pipeline unit 35 performs texture mapping processing by referencing the texture texel color which is provided from the texture buffer 16 using the above-mentioned texel coordinate values (addresses). The pixel pipeline unit 35 also performs such processing as alpha blending using the alpha value, fogging using the fog value, and pixel testing. The pixel data that is read out from this pixel pipeline unit 35 is sent to the frame buffer 36.

Note that the texture's RGB values and alpha (A) values employed in texture mapping are stored in the texture buffer 16. The texture in this texture buffer 16 along with graphics information, which is to be stored in the memory 11, is that which is imported from various recording media such as, for example, a CD-ROM, DVD-ROM, or semiconductor memory, or via wired or wireless telecommunication media or transmission media. Furthermore, the Z value, which represents the distance from the viewing point in the direction of the depth of the image, is stored in the Z buffer 17. The Z value stored in this Z buffer 17 is a value generated through a Z test.

The frame buffer 36 comprises at least memory space corresponding to a display 19 (two-dimensional screen) such as a television receiver, and in that memory space each pixel data is written so as to correspond to the two-dimensional screen coordinates of the display 19. The screen data to be formed frame by frame by this frame buffer 36 is thereafter read out as needed from a display controller 18.

The display controller 18 generates the horizontal synchronizing signal and vertical synchronizing signal for the television receiver, and in addition, linearly extracts the pixel data, in order, from the frame buffer 36, in accordance with the display timing of the television receiver. The two-dimensional image comprising these linear, sequentially extracted color values is displayed upon the display 19.

Nonlinear Interpolation According to the DDA Parameter Feedback

In the image rendering apparatus of this embodiment, each parameter obtained through a straight line generating algorithm by the DDA unit 34 (hereafter referred to as DDA processing) is fed back to the setup unit 31 so as to adjust the DDA parameters. This process of re-inputting the DDA parameters into the DDA unit 34 is repeated a desired number of times, making it possible to generate nonlinear output that is impossible to generate by only one cycle through the DDA unit 34.

In the following, nonlinear interpolation based on DDA parameter feedback is described.

To begin with, by setting the initial coordinate values of the DDA parameters, which are first set by the above-mentioned setup unit 31, to $(x\_0, y\_0)$ and the gradient to $m\_0$, the above-mentioned DDA unit 34 generates the straight line represented by the following Equation (1) through the first (first time) DDA processing. Note that x in the equation is each x coordinate value for every step interval $\Delta x$, which is obtained by multiplying a predetermined step interval $\Delta x$ by k (k=0,1,2,3, . . . ).

$$y = m\_0 * x + y\_0 \quad (1)$$

Next, in the case of performing the second DDA processing, the setup unit 31, when calculating the y coordinate corresponding to the kth x coordinate, adjusts the DDA parameters by assigning the (k−1)th x,y coordinate values to the kth initial x,y coordinates, and use the y coordinate value corresponding to the (k−1)th x coordinate of the first DDA processing as the gradient for calculating the y coordinate corresponding to the kth x coordinate of this second DDA processing. Then, the setup unit 31 re-inputs these reset DDA parameters into the DDA unit 34. Accordingly, in the second DDA processing by the DDA unit 34, a quadratic curve represented by Equation (3), which is the integration of Equation (2), is generated. Note that c in Equation (3) is a constant, and m is the gradient corresponding to each x coordinate for every predetermined step interval Δx.

$$dy/dx = m\_0 * x + y\_0 \qquad (2)$$

$$y = 0.5 * m * x\char`\^2 + y\_0 * x + c \qquad (3)$$

More specifically, the y coordinate of the straight line generated by the above-mentioned first DDA processing is a value represented by m_0*x+y_0, and if this y coordinate value is substituted into Equation (1) as the gradient during the second DDA processing, the quadratic curve in the following Equation (4) is generated by the DDA unit 34.

$$y = (m\_0 * x + y\_0) * x + y\_1 = m\_0 * x\char`\^2 + y\_0 * x + y\_1 \qquad (4)$$

Note that in the case where, for example, the third DDA processing is to be performed, as in the above-mentioned second DDA processing, the setup unit 31 resets the DDA parameters by assigning the (k−1)th x,y coordinate values to the kth initial x,y coordinates, and using the y coordinate value corresponding to the (k−1)th x coordinate generated in the first DDA processing as the gradient for calculating the y coordinate corresponding to the kth x coordinate in this third DDA processing. Accordingly, a skew curve is generated by the DDA unit 34.

Similarly, the image rendering apparatus of this embodiment is capable of generating curves of the Nth order, which are represented by the following Equation (5), by repeating N times the cycle of DDA parameter setting by the setup unit 31 and DDA processing by the DDA unit 34.

$$y = m\_0 * x\char`\^N + y\_0 * x\char`\^(N-1) + y\_1 * x\char`\^(N-2) + \ldots + y\_(N-2) * x + y\_(N-1) \qquad (5)$$

The aspects of generating a straight line through the first DDA processing by the DDA unit 34, and generating a quadratic curve by re-setting the DDA parameters for the second DDA processing using the post-first DDA processing x,y coordinate values are described forthwith in detail using the structure in FIG. 1 and FIG. 2 through FIG. 4.

When performing DDA processing, the CPU 14 controls the control register 15 to output a control code for designating either the first DDA processing or the second DDA processing. This control code is sent to the control logic 32.

The control logic 32 selects either sending the graphics information supplied from the geometry processor 12 to the parameter setting unit 33 or sending the values fed back from the DDA unit 34 to the parameter setting unit 33 in conformity with the above-mentioned control code. Namely, in the case of this example, the control code for the first DDA processing is that which controls the changeover operation of the control logic 32 such that the graphics information from the geometry processor 12 is sent to the parameter setting unit 33; on the other hand, the control code for the second DDA processing controls the changeover operation of the control logic 32 such that the feedback values from the DDA unit 34 are sent to the parameter setting unit 33. After the control code is supplied to the control logic 32, the first DDA processing will begin.

To begin with, the CPU 14 controls the control register 15 to output the control code for the first DDA processing. In conformity with this control code, the control logic 32 outputs to the parameter setting unit 33 the graphics information from the geometry processor 12. The parameter setting unit 33 at this time generates the initial DDA parameter values for the initial coordinate values (x_0,y_0) of (0,0) and the gradient of, for example, a based upon the graphics information. Next, the DDA unit 34 performs the first DDA processing, or in other words, arithmetic processing according to a typical straight line generating algorithm, using the initial DDA parameter values which are generated by the setup unit 31.

Here, if the step interval Δx of the x coordinate is 1.0, then in this first DDA processing, the straight line indicated in Equation (6) for m_0=a, x=Δx*k, and y_0=0 in the aforementioned Equation (1) is generated.

$$y = a * \Delta x * k \qquad (6)$$

Note that k=0,1,2, ... in the equation, and Δx*k corresponds to each x coordinate for each of the above-mentioned step intervals Δx. Accordingly, this first DDA processing provides the straight line L1 shown in FIG. 3 with such x,y coordinate values as indicated in the table of FIG. 2. Each of the x,y coordinate values obtained through the first DDA processing by this DDA unit 34 are fed back to the setup unit 31.

Next, the CPU 14 controls the control register 15 to output the control code for the second DDA processing. The control logic 32 outputs the values fed back from the DDA unit 34 to the parameter setting unit 33 in conformity with this control code. The parameter setting unit 33 at this time resets the DDA parameters by assigning the (k−1)th x,y coordinate values to the kth initial x,y coordinates, and using the y coordinate value corresponding to the (k−1)th x coordinate of the x,y coordinate values represented by the table in FIG. 2 and the straight line L1 in FIG. 3, which are obtained through the above-mentioned first DDA processing, as the gradient for calculating the y coordinate corresponding to the kth x coordinate obtained through this second DDA processing. Then, the DDA unit 34 performs the second DDA processing using these reset DDA parameters.

To explain in further detail, in this second DDA processing, when k=0, the parameter setting unit 33, as in the case of the first DDA processing, assigns the x,y coordinate values (0,0) to the initial coordinates (x_0,y_0).

Next, in this second DDA processing, when k=1, the parameter setting unit 33 assigns the x,y coordinate values (0,0) for k=0 to the initial coordinates (x_0,y_0), and in addition, assigns the y coordinate value (y=0) obtained through the first DDA processing for k=0 as the gradient. Thus, in the second DDA processing, the x,y coordinate values for k=1 become x=0+Δx=1, y=0*Δx+0=0.

Furthermore, in this second DDA processing, when k=2, the parameter setting unit 33 assigns the x,y coordinate values (1,0) for k=1 to the initial coordinates (x_0,y_0), and in addition, assigns the y coordinate value (y=a) obtained through the first DDA processing for k=1 as the gradient. Accordingly, in the second DDA processing, the x,y coordinate values for k=2 become x=1+Δx=2, y=a*Δx+0=a.

Moreover, in this second DDA processing, when k=3, the parameter setting unit 33 assigns the x,y coordinate values (2,a) for k=2 to the initial coordinates (x_0,y_0), and assigns the y coordinate value (y=2a) obtained through the first DDA processing for k=2 as the gradient. Accordingly, in the second DDA processing, the x,y coordinate values for k=3 become x=2+Δx=3, y=2a*Δx+a=3a.

In the same manner, in this second DDA processing, when k=4 the parameter setting unit 33 assigns the x,y coordinate values (3,3a) for k=3 to the initial coordinates (x_0,y_0), and assigns the y coordinate value (y=3a) obtained through the first DDA processing for k=3 as the gradient. Accordingly, in the second DDA processing, the x,y coordinate values for k=4 become x=3+Δx=4, y=3a*Δx+3a=6a. The subsequent procedure is performed in the same manner and its description is omitted.

To summarize thus far, this second DDA processing provides a quadratic curve L2 such as is shown in FIG. 3 and with such x,y coordinate values as indicated in the table of FIG. 4.

In this manner, according to this embodiment, implementation of nonlinear interpolation is possible by just controlling the control logic 32 of the setup unit 31 in conformity with the control code, along with performing the re-setting of DDA parameters by feeding back to the parameter setting unit 33 the values obtained through DDA processing by the DDA unit 34. Note that the control code may be stored in the memory 11, for example. In this case, the CPU 14 is able to read out the control code from the memory 11 through direct memory access so as to send it to the control logic 32. In the case where the control code is stored in the memory 11 as such, the control register 15 in FIG. 1 becomes unnecessary.

Example of Nonlinear Interpolation Performed by the First DDA Processing

The image rendering apparatus of this embodiment may also perform nonlinear interpolation through the first DDA processing. Namely, in the case of performing nonlinear interpolation through the first DDA processing, the parameter setting unit 33 resets the DDA parameters in the aforementioned Equation (6) such that the y coordinate value corresponding to the (k−1)th x coordinate is the gradient for calculating the y coordinate value corresponding to the kth x coordinate.

Hereinafter explaining in order, in the case where nonlinear interpolation is performed through the first DDA processing, when k=0, the parameter setting unit 33 assigns the x,y coordinate values (0,0) to the initial coordinates (x_0,y_0), and also sets the gradient initial value to be a, for example.

Next, when k=1, the parameter setting unit 33 assigns the gradient initial value a for k=0 to the gradient for k=1. Accordingly, the x,y coordinate values for k=1 become x=0+Δx=1, y=a*1=a.

Furthermore, when k=2, the parameter setting unit 33 assigns the y coordinate value (y=a) obtained for k=1 to the gradient for k=2. Accordingly, the x,y coordinate values for k=2 become x=1+Δx=2, y=a*2=2a.

Moreover, when k=3, the parameter setting unit 33 assigns the y coordinate value (y=2a) obtained for k=2 to the gradient for k=3. Accordingly, the x,y coordinate values for k=3 become x=2+Δx=3, y=2a*3=6a.

Similarly, when k=4, the parameter setting unit 33 assigns the y coordinate value (y=6a) obtained for k=3 to the gradient for k=4. Accordingly, the x,y coordinate values for k=4 become x=3+Δx=4, y=6a*4=24a. The subsequent procedure is performed in the same manner and its description is omitted.

Figures 5, 6:
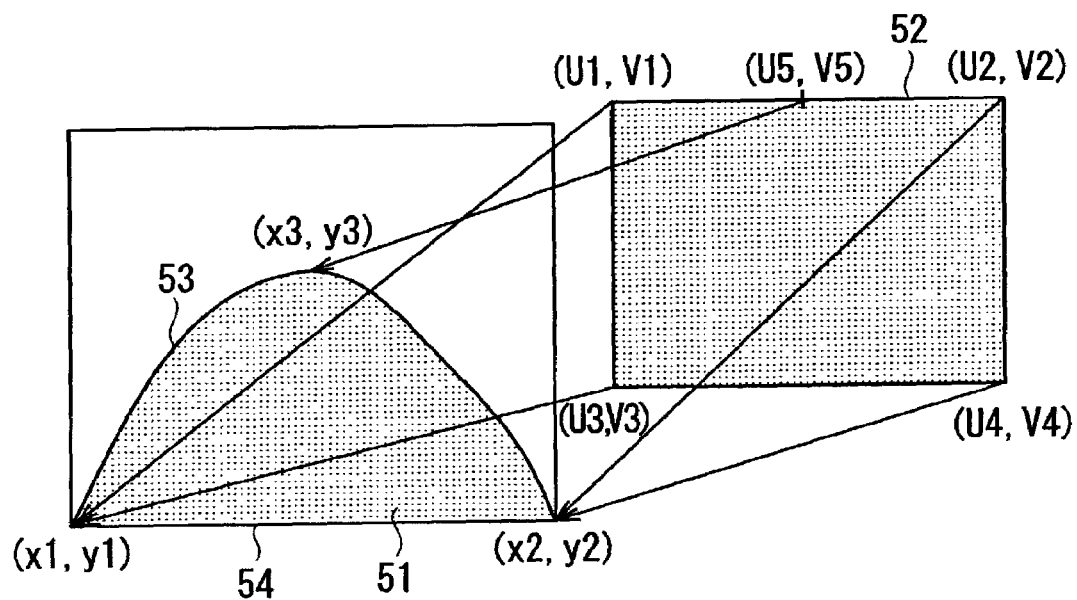
FIG. 5 is a diagram showing the x, y coordinate values generated in the case where nonlinear interpolation is performed by the first DDA processing.
FIG. 6 is a diagram showing a polygon which is obtained through nonlinear interpolation according to an embodiment of the present invention, and an aspect of texture mapping to the polygon.

To summarize thus far, in the DDA processing of this case, the curve L3 shown in FIG. 3 and with such x,y coordinate values as indicated in the table of FIG. 5 may be obtained.

Note that in the case where nonlinear interpolation is performed through the above-mentioned first DDA processing, the image rendering apparatus may, as previously mentioned, feed back the x,y coordinate values and re-set the DDA parameters by the second or subsequent DDA processing.

Application of Nonlinear Interpolation

According to the nonlinear interpolation of this embodiment discussed above, for example, as shown in FIG. 6, performing texture mapping on a curved line basis is possible. Namely, if the polygon 51 including the curved line 53 is generated through such nonlinear interpolation, it is possible to easily calculate texel coordinate values (address (U,V) for referencing a texel color) from the x,y coordinate values of that polygon 51. In the case of the example of FIG. 6, the image rendering apparatus of this embodiment, by performing the aforementioned nonlinear interpolation, calculates the curved line 53 which is represented by the node coordinate values (x1,y1), (x3,y3), and (x2,y2) from the node coordinate values (x1,y1) and (x2,y2) of the straight line 54, easily generating the polygon 51 enclosed by this straight line 54 and curved line 53. Then, texture mapping of the polygon 51 including the above-mentioned curved line 53 is possible by corresponding the node coordinate values (x1,y1) of the polygon 51 to the texel coordinate values (u1,v1) and (u3,v3) of the texture 52; corresponding the node coordinate values (x2,y2) to the texel coordinate values (u2,v2) and (u4,v4); and corresponding the node coordinate values (x3,y3) upon the curved line 53 to the texel coordinate values (u5,v5). As such, the nonlinear interpolation of this embodiment may significantly reduce the load for calculating the texel coordinates from the polygon node coordinates.

Figure 7:
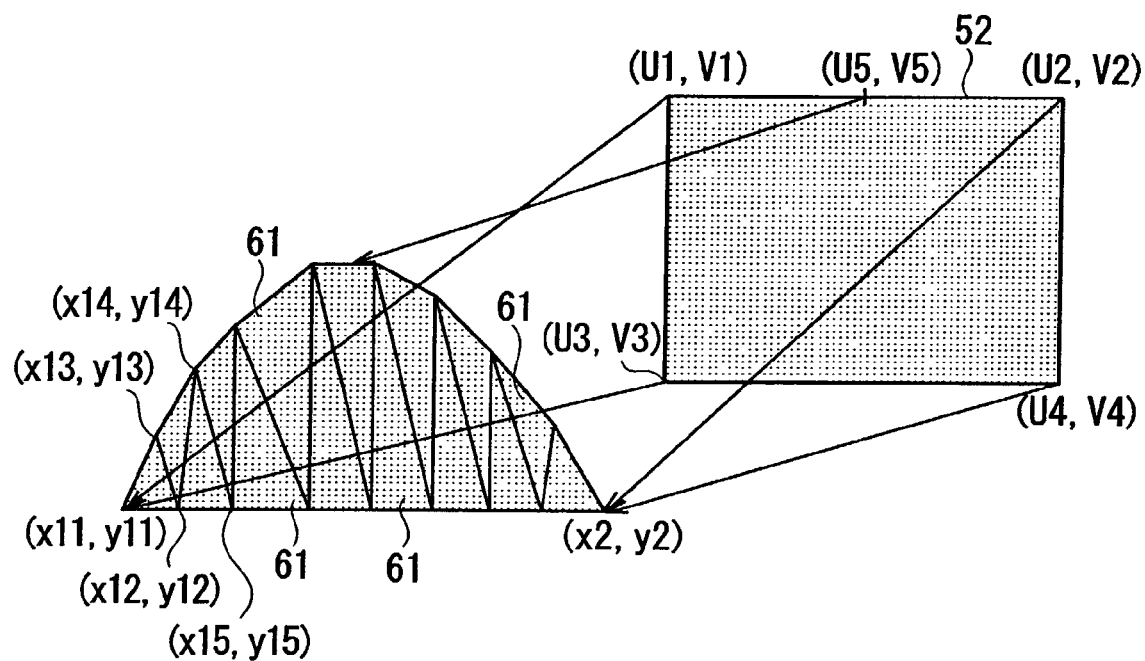
FIG. 7 is a diagram showing approximated curved lines which are generated using a plurality of polygons, and an aspect of texture mapping to those polygons.

Note that FIG. 7, as a comparative example to FIG. 6 of this embodiment, shows the aspects of texture mapping in the conventional case where curved lines are approximately represented by a plurality of polygons 61. According to the example of FIG. 7, a plurality of polygons 61 are necessary in order to represent a curved line; node coordinates (x11, y11), (x12,y12), (x13,y13), (x14,y14), (x15,y15), . . . of each of those plurality of polygons 61 are generated; and linear interpolation and determination of the texel coordinates is performed on the basis of each of those nodes. As a result, an extremely heavy load is imposed upon the CPU 14, the geometry processor 12, the rendering processor 30 and the bus connected therebetween. By contrast, according to this embodiment, a nonlinear polygon may be generated without imposing a load on the CPU 14, the geometry processor 12, the rendering processor 30 and the bus connected therebetween. Furthermore, texture mapping along the curved line may be easily implemented. Note that excluding the case where, for example, an extremely large polygon is handled at high speed, the rendering processor 30 can perform DDA processing multiple times by feeding back the DDA parameters as described above with an extremely lighter load and with less problems than in the case of handling a plurality of polygons as in the above-mentioned FIG. 7.

Figure 8:
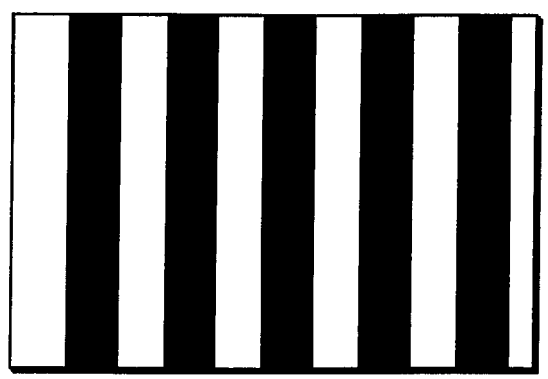
FIG. 8 is a diagram showing the texture of a striped pattern.
Figure 9:
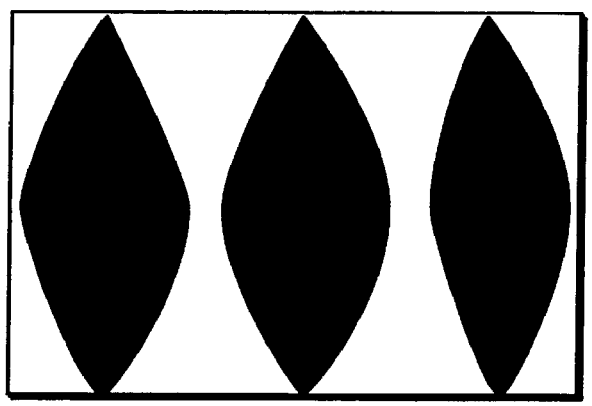
FIG. 9 is a diagram showing a design obtained by repeating DDA processing twice while switching to positive and negative the codes of the DDA parameters employed in each DDA processing, and mapping the texture of FIG. 8.
Figure 10:
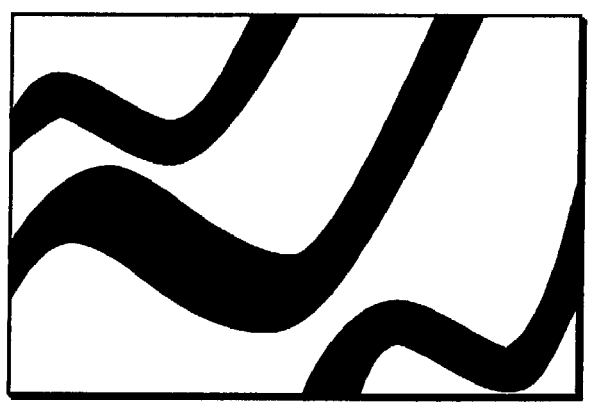
FIG. 10 is a diagram showing a design obtained by repeating DDA processing three times and mapping the texture of FIG. 8.
Figure 11:
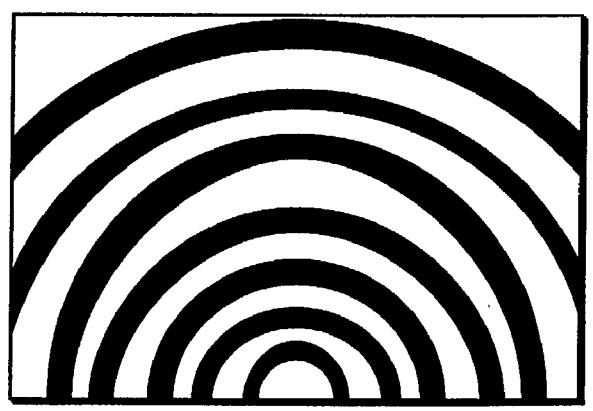
FIG. 11 is a diagram showing an example of a concentric circle design that is implemented by repeating DDA processing twice while mapping the texture of FIG. 8 by gradually decreasing the gradient value of the DDA parameters.

FIG. 8 through FIG. 11 show a variety of texture mapping examples that may be implemented by changing the method of setting the DDA parameters from the values obtained through the above-mentioned DDA processing with the use of, for example, a striped texture such as shown in FIG. 8. The example in FIG. 9 shows a design obtained by repeating DDA processing twice while alternately switching to positive and negative the codes of the DDA parameters that are employed in each DDA processing and mapping the texture in FIG. 8. The example in FIG. 10 shows a design obtained by repeating DDA processing three times and mapping the texture in FIG. 8. The example in FIG. 11 shows an example of a concentric circle design that is implemented by repeating DDA processing twice while gradually decreasing the gradient value of the DDA parameters and mapping the texture in FIG. 8.

Note that through the image processing of this embodiment, in addition to the generation of the above-mentioned nonlinear polygons and the nonlinear processing for texture mapping, for example by nonlinearly transforming the RGBA values, it is possible to, for example, nonlinearly transform color, nonlinearly transform the brightness of light that reflects off an object surface, and nonlinearly transform transparency.

As described above, the image rendering apparatus of the present invention can set, using the control codes, the setup conditions such as the number of times to feed back the DDA parameters, and the number, type, positive/negative codes, etc. of the DDA parameters, which will be reset, and also set desired values to the number of times to feed back the DDA parameters and the number, type and positive/negative codes of the DDA parameters, thereby implementing various image effects.

Alternative Structural Example

The image rendering of this embodiment can be implemented not only in conformity with a hardware configuration such as shown in FIG. 1 above, but may naturally be implemented through software (i.e., an application program for a computer, etc.).

Figure 12:
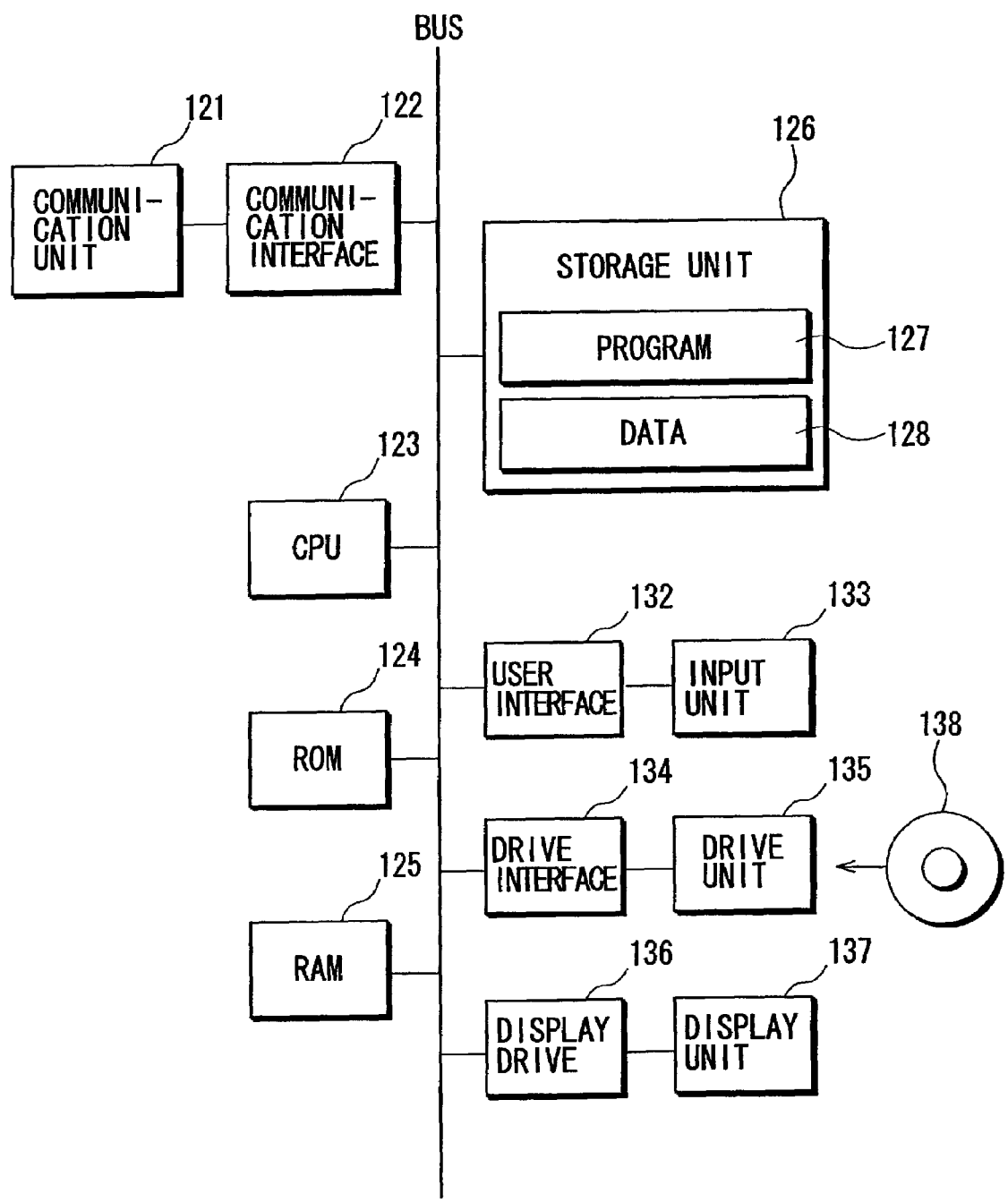
FIG. 12 is a block diagram showing a schematic structure of a computer that implements the image rendering process according to an embodiment of the present invention.
Figure 13:
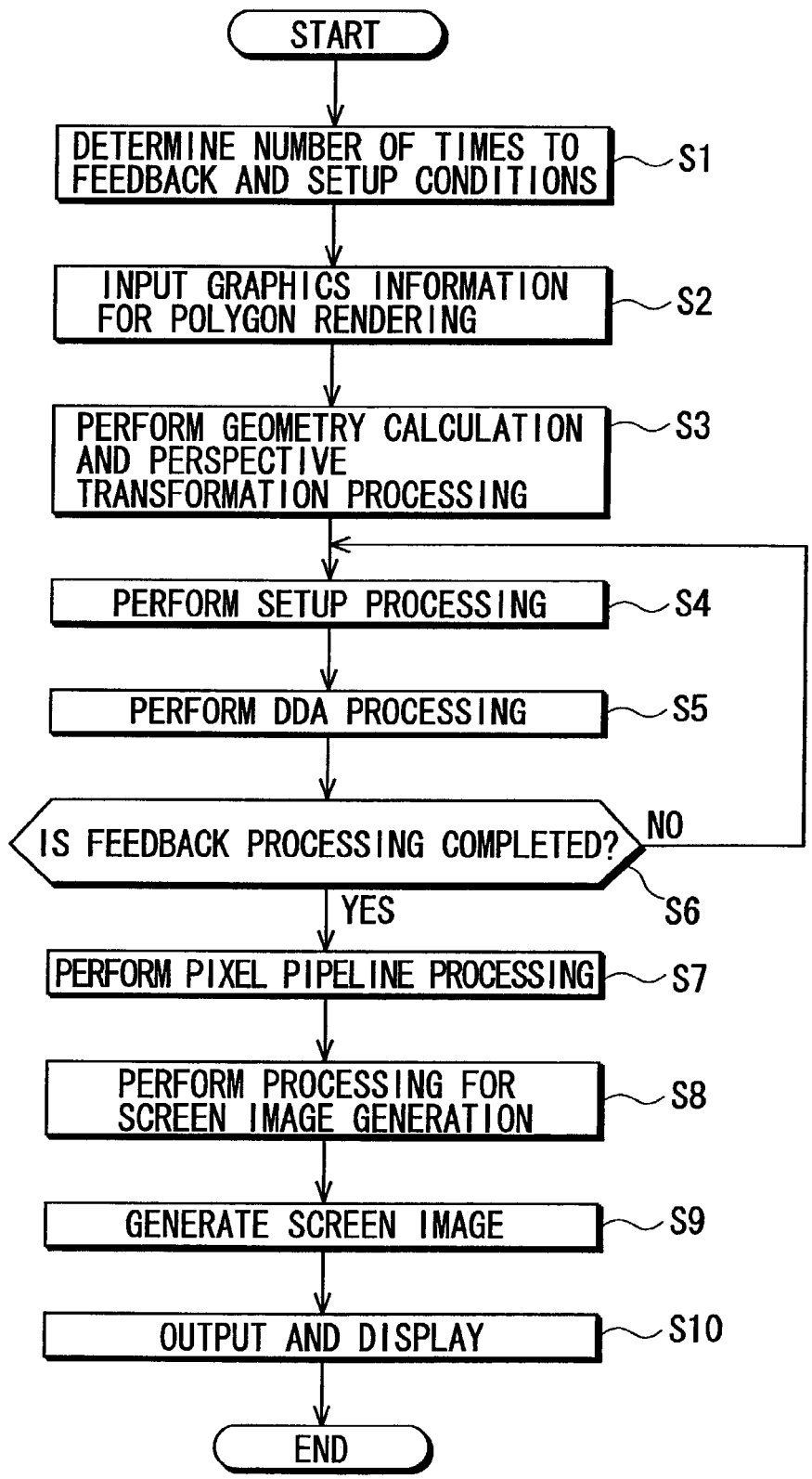
FIG. 13 is a flowchart showing the processing steps in the case where the image rendering process according to an embodiment of the present invention is implemented by a computer.

FIG. 12 and FIG. 13 show a configuration and operation for implementing the image rendering process of the present embodiment in a computer. FIG. 12 shows a structural example of the main elements of the computer; and FIG. 13 shows the general process flow in the case where the CPU 123 of the computer of FIG. 12 executes a computer program including an image rendering program of this embodiment.

To begin with, the configuration of FIG. 12 is described.

In FIG. 12, the storage unit 126 comprises, for example, a hard disk and a hard disk drive. Within the storage unit 126 are stored, for example, an operating system program, a computer program (image rendering program) 127 which implements the image rendering process of this embodiment using a software algorithm, and the various data 128 such as the aforementioned graphics information and texture to be used for polygon plotting. The computer program 127 and the various data 128 are read out from a variety of recording media such as a CD-ROM, DVD-ROM, etc., or downloaded via a telecommunication line and stored in the storage unit 126.

The telecommunication unit 121 is a communications device for performing external data communications, such as a modem for connecting to an analog public telephone line, a cable modem for connecting to a cable television network, a terminal adapter for connecting to an integrated services digital network (ISDN), or a modem for connecting to an asymmetric digital subscriber line (ADSL). The telecommunication interface unit 122 is an interface device for performing protocol conversion and the like to allow the exchange of data between the telecommunication unit 121 and an internal bus (BUS).

The input unit 133 is an input device such as a keyboard, mouse, or touch pad; the user interface unit 132 is an interface device for internally providing a signal from the input unit 133.

The drive unit 135 is a drive device that allows various programs or data to be read out from, for example, disc media 138 such as a CD-ROM, DVD-ROM or floppy disc, or from a card-shaped semiconductor memory. The drive interface unit 134 is an interface device for internally providing a signal from the drive unit 135.

The display unit 137 is a display device such as a cathode ray tube (CRT) or liquid crystal display device; the display drive unit 136 is a drive device which drives the display of the display unit 137.

The CPU 123 provides general control of the personal computer based upon an operating system program or a computer program 127 of this embodiment stored in the storage unit 126.

The ROM 124 comprises, for example, a rewritable nonvolatile memory such as a flash memory and stores the basic input/output system (BIOS) and various initial settings of the personal computer. The RAM 125 stores application programs read out from the hard disk of the storage unit 126 and various data such as the post-Z test Z value, and in addition, is used as the working RAM of the CPU 123.

With the structure shown in FIG. 12, the CPU 123 implements the image rendering process of the earlier described embodiment through the execution of the computer program 127 of this embodiment which is one of the application programs read out from the hard disk of the storage unit 126 and loaded in the RAM 125.

Next, the process flow when the CPU 123 of the computer shown in FIG. 12 operates based on the computer program (image rendering program) 127 of this embodiment is described forthwith using FIG. 13.

In Step S1 of FIG. 13, the CPU 123, to begin with, determines the number of times to repeat DDA processing, in other words, the number of times to feed back to the polygon setup unit the values obtained through DDA processing, and the setup conditions for determining what value to assign to which DDA parameter using the feedback values.

Next, in Step S2, the CPU 123 reads out from the storage unit 126 graphics information and texture and the like to be used for polygon rendering which are pre-read out from disc media 138 and stored as data 128 in, for example, the storage unit 126. The CPU 123 holds this information in the RAM 125.

Next, in Step S3, the CPU 123 reads out the above-mentioned graphics information held in the RAM 125 and employs affine transformations, projection transformation to screen coordinates, geometry calculations such as ray tracing for the nodes, and projection transformation processing for the graphics information.

Next, in Step S4, the CPU 123 sets up the DDA parameters based on the graphics information obtained through the above-mentioned geometry calculations. Note that in the case where the values obtained through DDA processing are fed back, the CPU 123, in Step S4, performs re-setting up of the DDA parameters using the feedback values.

Next, in Step S5, the CPU 123 performs DDA processing using the DDA parameters set up in the Step S4. Then, in Step S6, the CPU 123 determines whether the feedback process has completed the number of cycles determined in Step S1; and when not completed, returns to the processing of Step S4.

When completion of the feedback process has been determined in Step S6, the CPU 123, in Step S7, performs texture mapping processing while considering the Z values, and performs pixel pipeline processing such as alpha blending, fogging and pixel testing.

Thereafter, in Step S8, the CPU 123 generates screen image information from the post-pixel pipeline processed pixel data, and further, in Step S9, sends this screen image information to the display drive 136. Accordingly, in Step S10, an image is displayed upon the display unit 137.

As shown above, the present invention makes it possible to implement nonlinear interpolation calculations from, for example, linear interpolation calculations, through the setting of parameters used in a predetermined interpolation calculation, performing the predetermined interpolation calculation based on those parameters, and re-setting the parameters based on the values obtained through this interpolation calculation and re-inputting into the interpolation calculation thereof. Therefore, according to the present invention, it is possible to easily implement polygons and the like having curved line portions, for example, in computer graphics.

Note that the description of the above-mentioned embodiment is only an example of the present invention. Accordingly, the present invention is not limited to the embodiments described above, but may naturally include various modifications in design and the like without departing from the technical spirit and scope of the invention. For example, the image rendering process of this embodiment is not limited to being performed on a dedicated home video game unit or personal computer, but may also be implemented by various information processing devices including mobile terminals.

The invention claimed is:

1. An image rendering method, comprising:
   a) determining a number of times M that a predetermined interpolation calculation is to be carried out to obtain a desired image effect;
   b) providing an initial calculation parameter used in the predetermined interpolation calculation;
   c) performing the predetermined interpolation calculation a first time based upon the initial calculation parameter to produce a plurality of result parameters;
   d) performing the predetermined interpolation calculation one additional time after replacing the initial calculation parameter with one of the result parameters of the first predetermined interpolation calculation to produce a plurality of result parameters of the additional predetermined interpolation calculation; and
   e) performing the predetermined interpolation calculation (M−2) additional times, each one being performed after replacing the calculation parameter used in its immediately preceding predetermined interpolation calculation with one of the result parameters of the immediately preceding predetermined interpolation calculation to produce a plurality of result parameters of the current predetermined interpolation calculation, thereby obtaining the desired image effect.

2. The image rendering method according to claim 1, wherein
   the step of providing an initial parameter includes setting an initial value for a parameter which represents at least one of color, brightness and transparency of polygon nodes used in computer graphics.

3. An image rendering method, comprising:
   a) determining a number M of interpolation calculations that are to be carried out to obtain a desired image effect;
   b) providing an initial calculation parameter used in a predetermined interpolation calculation;
   c) performing the predetermined interpolation calculation based upon the initial calculation parameter to produce a plurality of result parameters;
   d) performing another interpolation calculation after replacing the initial calculation parameter with one of the result parameters of the predetermined interpolation calculation to produce a plurality of updated result parameters of the another interpolation calculation, and
   e) successively performing (M−2) additional interpolation calculations, each one using as its calculation parameter one of the plurality of result parameters of the interpolation calculation performed immediately before that additional interpolation calculation to produce a plurality of result parameters of that additional interpolation calculation, thereby obtaining the desired image effect,
   the predetermined interpolation calculation being a linear calculation performed on x,y coordinate values with a gradient value based upon polygon node x,y coordinate values used in computer graphics, the interpolation calculation being of the form:

$$y = G \cdot x + y_0,$$

where G is the gradient value and $y_0$ is an initial value of y; and
   the another interpolation calculation and each one of the (M−2) additional interpolation calculations being of the relation:

$$y = m_0 \cdot x^N + y_0 \cdot x^{(N-1)} + y_1 \cdot x^{(N-2)} + \ldots + y_{(N-2)} X + Y_{(N-1)},$$

where N=2 for the another interpolation calculation and N=3, ..., M for the (M−2) additional interpolation calculations.

4. An image rendering apparatus, comprising:
   a determining unit operable to determine a number of times M that a predetermined interpolation calculation is to be carried out to obtain a desired image effect;
   a parameter setting unit operable to set a value for a calculation parameter used in the predetermined interpolation calculation;
   a calculating unit operable to perform the predetermined interpolation calculation based upon the calculation parameter value set by the parameter setting unit;
   a feedback unit operable to feed back to said parameter setting unit a given value obtained through the predetermined interpolation calculation; and
   a controlling unit operable to control a number of times that said feedback unit feeds back to said parameter setting unit being operable to control said calculating unit to perform the predetermined interpolation calculation the M times to thereby obtain the desired image effect;
   said parameter setting unit providing said calculating unit with a new value of the calculation parameter based upon the value fed back by the feedback unit for use by said calculating unit in performing the predetermined interpolation calculation again.

5. The image rendering apparatus according to claim 4, wherein
   the initial value for a the calculation parameter represents at least one of color, brightness and transparency of polygon nodes used in computer graphics.

6. An image rendering apparatus, comprising:
   a determining unit operable to determine a number M of interpolation calculations that are to be carried out to obtain a desired image effect;

a parameter setting unit operable to set an initial value for a calculation parameter;

a calculating unit operable to perform the interpolation calculations, a first interpolation calculation being based upon the calculation parameter initial value set by the parameter setting unit; and a feedback unit operable to feed back to said parameter setting unit an associated value obtained through said calculating unit performing a given interpolation calculation, said parameter setting unit being further operable to provide said calculating unit with a particular new value of the calculation parameter based on the associated value fed back by said feedback unit, said calculating unit being further operable to perform a further interpolation calculation using the particular new value of the calculation parameter;

a controlling unit operable to control a number of times that said feedback unit feeds back to said parameter setting unit to control said calculating unit to successively performs (M−1) additional interpolation calculations each one using as its calculation parameter the particular new value that was provided based on the associated value obtained through the interpolation calculation performed immediately before that interpolation calculation, thereby obtaining the desired image effect; wherein the calculating unit performs the predetermined interpolation calculation on x,y coordinate values with a gradient value G based upon polygon node x,y coordinate values used in computer graphics, the predetermined interpolation calculation being of the form:

$y = G \cdot x + y_0$, where $y_0$ is an initial value of y, the parameter setting unit providing to the calculating unit as a replacement for at least the gradient value a value obtained through the predetermined interpolation calculation, and the another interpolation calculation and each one of the (M−2) additional interpolation calculation of the relation:

$y = m_0 \cdot x^N + y_0 \cdot x^{(N-1)} + y_1 \cdot x^{(N-2)} + \ldots + y_{(N-2)} X + Y_{(N-1)}$, where N=2 for the another interpolation calculation and N=3, . . . , M for the (M−2) additional interpolation calculations.

7. A computer readable recording medium recorded with a program for carrying out an image rendering method, the image rendering method comprising:

a) determining a number of times M that a predetermined interpolation calculation is to be carried out to obtain a desired image effect;

b) providing an initial calculation parameter used in the predetermined interpolation calculation;

c) performing the predetermined interpolation calculation a first time based upon the initial calculation parameter to produce a plurality of result parameters;

d) performing the predetermined interpolation calculation one additional time after replacing the initial calculation parameter with one of the result parameters of the first predetermined interpolation calculation to produce a plurality of result parameters of the additional predetermined interpolation calculation; and e) the performing interpolation calculation (M−2) additional times, each one being performed after replacing the calculation parameter used in its immediately preceding predetermined interpolation calculation with one of the result parameters of the immediately preceding predetermined interpolation calculation to produce a plurality of result parameters of the current predetermined interpolation calculation, thereby obtaining the desired image effect.

8. The computer readable recording media according to claim 7, wherein in the image rendering method, the step of providing an initial calculation parameter includes setting an initial value for a parameter which represents at least one of color, brightness and transparency of polygon nodes used in computer graphics.

9. A computer readable recording medium recorded with a program for carrying out an image rendering method, said method comprising:

a) determining a number M of interpolation calculations that are to be carried out to obtain a desired image effect;

b) providing an initial calculation parameter used in a predetermined interpolation calculation;

c) performing the predetermined interpolation calculation based upon the calculation initial parameter to produce a plurality of result parameters;

d) performing another interpolation calculation after replacing the initial calculation parameter with one of the result parameters of the predetermined interpolation calculation to produce a plurality of updated result parameters of the another interpolation calculation; and e) successively performing (M−2) additional interpolation calculations, each one using as its calculation parameter one of the plurality of result parameters of the interpolation calculation performed immediately before that additional interpolation calculation to produce a plurality of result parameters of that additional interpolation calculation, thereby obtaining the desired image effect, the predetermined interpolation calculation being a linear calculation performed on x,y coordinate values with a gradient value based upon polygon node x,y coordinate values used in computer graphics, the interpolation calculation being of the form:

$y = G \cdot x + y_0$, where G is the gradient value and $y_0$ is an initial value of y; and the another interpolation calculation and each one of the (M−2) additional interpolation calculations being of the relation:

$y = m_0 \cdot x^N + y_0 \cdot x^{(N-1)} + y_1 \cdot x^{(N-2)} + \ldots + y_{(N-2)} X + Y_{(N-1)}$, where N=2 for the another interpolation calculation and N=3, . . . , M for the (M−2) additional interpolation calculations.

10. An image rendering system, comprising:

a processor operable to execute instructions for carrying out an image rendering method, said method including:

a) determining a number of times M that a predetermined interpolation calculation is to be carried out to obtain a desired image effect;

b) providing an initial calculation parameter used in the predetermined interpolation calculation;

c) performing the predetermined interpolation calculation a first time based upon the initial calculation parameter to produce a plurality of result parameters; d) performing the predetermined interpolation calculation an additional times after replacing the initial calculation parameter with one of the result parameters of the first predetermined interpolation calculation to produce a plurality of result parameters of the additional predetermined interpolation calculation; and e) performing the predetermined interpolation calculation (M−2) additional times, each one being performed after replacing the calculation parameter used in its immediately preceding predetermined interpolation calculation with one of the result parameters of the immediately preceding predetermined interpolation calculation to produce a plurality of result parameters of the current predetermined interpolation calculation, thereby obtaining the desired video effect.

11. An image rendering method, comprising:

a) determining a number M of interpolation calculations that are to be carried out to obtain a desired image effect;

b) providing an initial calculation parameter used in a predetermined interpolation calculation;

c) performing the predetermined interpolation calculation based upon the initial calculation parameter to produce a plurality of result parameters;

d) performing another interpolation calculation after replacing the initial calculation parameter with one of the result parameters of the predetermined interpolation calculation to produce a plurality of result parameters of the another interpolation calculation; and e) successively performing (M−2) additional interpolation calculations, each one using as its calculation parameter one of the plurality of result parameters of the interpolation calculation performed immediately before that additional interpolation calculation to produce a plurality of result parameters of that additional interpolation calculation, thereby obtaining the desired image effect, wherein the predetermined interpolation calculation is a linear calculation, the another interpolation calculation is a second order calculation, and each one of the (M−2) additional interpolation calculations is a higher order calculation than the interpolation calculation performed immediately before that additional interpolation calculation.

12. An image rendering apparatus, comprising:

a determining unit operable to determine a number M of interpolation calculations that are to be carried out to obtain a desired image effect;

a parameter setting unit operable to set an initial value for a calculation parameter;

a calculating unit operable to perform the interpolation calculations, a first interpolation calculation being based upon the initial value for the calculation parameter set by the parameter setting unit;

a feedback unit operable to feed back to said parameter setting unit an associated value obtained through said calculating unit performing a given interpolation calculation, said parameter setting unit being further operable to provide said calculating unit with a particular new value of the calculation parameter based on the associated value fed back by said feedback unit, said calculating unit being further operable to perform a further interpolation calculation using the particular new value of the calculation parameter; and a controlling unit operable to control a number of times that said feedback unit feeds back to said parameter setting unit to control said calculating unit to successively performs (M−1) additional interpolation calculations each one using as its calculation parameter the particular new value that was provided based on the associated value obtained through the interpolation calculation performed immediately before that interpolation calculation, thereby obtaining the desired image effect;

wherein the predetermined interpolation calculation is a linear calculation, and each one of the (M−1) additional interpolation calculations is a higher order calculation than the interpolation calculation performed immediately before that additional interpolation calculation.

13. A computer readable recording medium recorded with a program for carrying out an image rendering method, said method comprising:

a) determining a number M of interpolation calculations that are to be carried out to obtain a desired image effect;

b) providing an initial calculation parameter used in a predetermined interpolation calculation;

c) performing the predetermined interpolation calculation based upon the initial calculation parameter to produce a plurality of result parameters;

d) performing another interpolation calculation after replacing the initial calculation parameter with one of the result parameters of the predetermined interpolation calculation to produce a plurality of updated result parameters of the another interpolation calculation; and e) successively performing (M−2) additional interpolation calculations, each one using as its calculation parameter one of the plurality of result parameters of the interpolation calculation performed immediately before that additional interpolation calculation to produce a plurality of result parameters of that additional interpolation calculation, thereby obtaining the desired image effect, wherein the predetermined interpolation calculation is a linear calculation, the another interpolation calculation is a second order calculation, and each one of the (M−2) additional interpolation calculations is a higher order calculation than the interpolation calculation performed immediately before that additional interpolation calculation.

14. An image rendering system, comprising:

a processor operable to execute instructions for carrying out an image processing method, said method including:

a) determining a number M of interpolation calculations that are to be carried out to obtain a desired image effect;

b) providing an initial calculation parameter used in a predetermined interpolation calculation;

c) performing the predetermined interpolation calculation based upon the initial calculation parameter to produce a plurality of result parameters;

d) performing another interpolation calculation after replacing the initial calculation parameter with one of the result parameters of the predetermined interpolation calculation to produce a plurality of result parameters of the another interpolation calculation; and e) successively performing (M−2) additional interpolation calculations, each one using as its calculation parameter one of the plurality of result parameters of the interpolation calculation performed immediately before that additional interpolation calculation to produce a plurality of result parameters of that additional interpolation calculation, thereby obtaining the desired video effect, wherein the predetermined interpolation calculation is a linear calculation, the another interpolation calculation is a second order calculation, and each one of the (M−2) additional interpolation calculations is a higher order calculation than the interpolation calculation performed immediately before that additional interpolation calculation.

* * * * *

UNITED STATES PATENT AND TRADEMARK OFFICE
CERTIFICATE OF CORRECTION

PATENT NO.        : 7,116,339 B2
APPLICATION NO. : 10/202425
DATED              : October 3, 2006
INVENTOR(S)       : Shinya Wada It is certified that error appears in the above-identified patent and that said Letters Patent is hereby corrected as shown below:

Column 5, line 2, "use" should read --uses--.

Column 12, line 29, "$y=m_0 \cdot x^{\wedge N}+y_0 x^{(N-1)}+y_1 x^{(N-2)}+ \ldots +y_{(N-2)}X+Y_{(N-1)}$" should read -- $y = m_0 \cdot x^N + y_0 \cdot x^{(N-1)} + y_1 \cdot x^{(N-2)} + \ldots + y_{(N-2)} \cdot x + y_{(N-1)}$ --.

Column 13, line 20, "performs" should read --perform--.

Column 13, line 42, "$y=m_0 \cdot x^{\wedge N}+y_0 x^{(N-1)}+ y_1 x^{(N-2)}+ \ldots +y_{(N-2)}X+Y_{(N-1)}$" should read -- $y = m_0 \cdot x^N + y_0 \cdot x^{(N-1)} + y_1 \cdot x^{(N-2)} + \ldots + y_{(N-2)} \cdot x + y_{(N-1)}$ --.

Column 13, line 63, "the performing interpolation" should read -- performing the predetermined interpolation--.

Column 14, line 48, "$y=m_0 \cdot x^{\wedge N}+y_0 x^{(N-1)}+y_1 x^{(N-2)}+ \ldots +y_{(N-2)}X+Y_{(N-1)}$" should read -- $y = m_0 \cdot x^N + y_0 \cdot x^{(N-1)} + y_1 \cdot x^{(N-2)} + \ldots + y_{(N-2)} \cdot x + y_{(N-1)}$ --.

Column 14, line 63, after "parameters;", start a new paragraph.

Column 14, line 65, "times" should read --time--.

Signed and Sealed this

Twenty-sixth Day of June, 2007

JON W. DUDAS
*Director of the United States Patent and Trademark Office*